July 6, 1954

J. FEY 2,682,823

ROTARY CUTTERHEAD FOR MOTOR CULTIVATORS

Filed Sept. 19, 1951

INVENTOR:
JOSEF FEY

BY:

Patented July 6, 1954

2,682,823

UNITED STATES PATENT OFFICE 2,682,823

ROTARY CUTTERHEAD FOR MOTOR CULTIVATORS

Josef Fey, Augsburg, Germany

Application September 19, 1951, Serial No. 247,328

Claims priority, application Germany September 28, 1950

3 Claims. (Cl. 97—212)

1

The present invention relates to a rotary cutter head for motor cultivators. The cutter head is provided with friction couplings which are pressed together by a compression spring arranged on one end of a driving shaft in order to provide a driving connection between the cutters and the said shaft.

In a known form of rotary cutter head of this kind, coupling sleeves with flanges on their ends are mounted so as to be axially slidable along, but not rotatable with respect to, the driving shaft. Between these coupling sleeves are arranged friction disks which are provided with laterally projecting hubs corresponding in diameter to the diameters of the flanges on the coupling sleeves and which, by means of these hubs, are mounted on the flanges of the coupling sleeves. This construction, however, has serious drawbacks. The parts where the friction disks are mounted on the flanges of the coupling sleeves are not protected against the entry of dirt, sand and the like, so that serious obstructions are liable to occur. Moreover, the friction disks have to project a substantial distance outside the diameter of the flanges on the coupling sleeves, so as to enable the cutters to be secured to these projecting friction disks. Consequently, the minimum working diameter of the rotary cutter head is unduly large, so that a relatively high driving torque and a correspondingly high power consumption are required to drive the rotary cutter head.

These disadvantages are obviated by the rotary cutter head according to the present invention, which comprises a plurality of radial friction disks, mounted for axial sliding movement but not for rotation with respect to the driving shaft of the cutter head, and having hubs which are arranged on said shaft, a plurality of coupling sleeves mounted on the hubs of said friction disks and having flanges on their ends adapted for engagement by means of their outer end surfaces with said friction disks, and cutters secured against the inside surfaces of the flanges at one end of each of said coupling sleeves.

In this cutter head construction, the bearing surfaces by means of which the coupling sleeves are mounted on the hubs of the friction disks are located on the inside, so that they are effectively protected against the entry of any dirt or the like.

A further important advantage is that, due to the cutters being secured to the flanges of the coupling sleeves, the minimum practicable working diameter of the cutter head is substantially reduced, so that a smaller driving torque and a

2 correspondingly reduced power consumption are achieved.

The invention is illustrated by way of example in the accompanying drawings in which.

Figure 1:
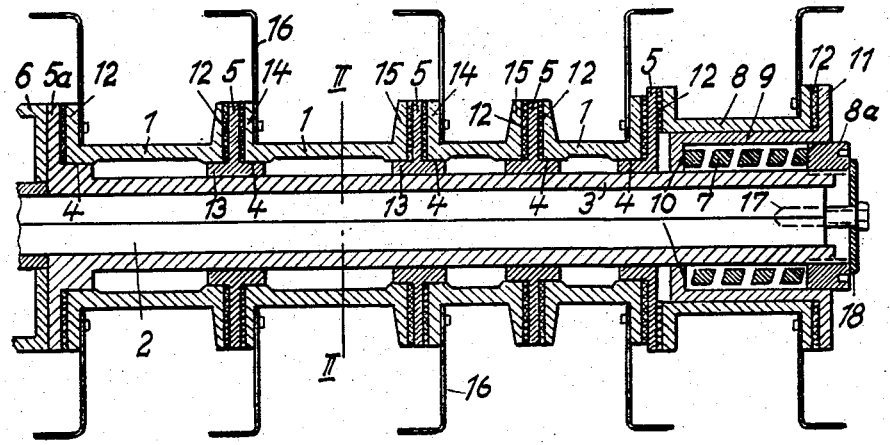
Figure 1 is a longitudinal section through part (right half) of a rotary cutter head constituting one embodiment of the invention and Figure 2 is a transverse section on the line II—II in Figure 1.
Figure 2:
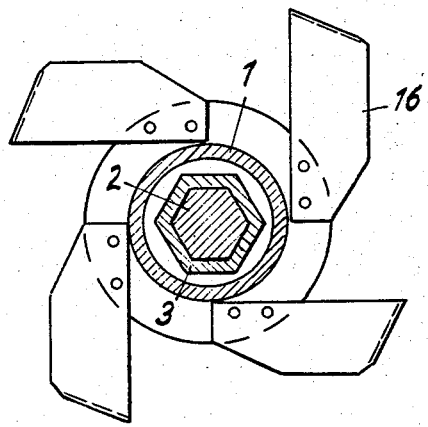

Referring to the drawings, Figures 1 and 2, the shaft 2 is mounted within a gear case 6 and driven by bevel gear wheels. A number of friction disks 5 are mounted by means of their hubs 13 on a hexagonal section sleeve 3 which is a close fit on a hexagonal section driving shaft 2 as shown in Figure 2. The hubs 13 are also hexagonal internally so as to be slidable on the sleeve 3 without being rotatable with respect thereto.

Mounted at 4 on the hubs 13 of the friction disks 5 are a number of coupling sleeves 1 provided with flanges 14 and 15. These flanges are located with their outer end surfaces against the friction disks 5 which are provided with friction linings 12.

Secured to the inside surface of each flange 14 are cutters 16. As can be seen from Figures 1 and 2 this construction, i. e. this method of mounting the cutters, enables the working diameter of the cutter head to be kept relatively small.

A helical compression spring 7 is provided in order to press the coupling sleeves 1 and friction disks 5 one against the other. As shown in Figure 1, the coupling sleeves 1, the friction disks 5 and the compression spring 7 are assembled on the hexagonal sleeve 3 so as to form a unitary assembly, which can be removed as such from the shaft 2. For this purpose, the left-hand friction disk 5a, as seen in Figure 1, is rigidly fixed to the hexagonal sleeve 3. The friction coupling assembly, which is constituted by the coupling sleeves 1 and the friction disks 5 and is resiliently compressed by the spring 7, is supported against this fixed friction disk 5a. A screw-threaded nut 8a serves for applying compression to the spring 7 on the hexagonal sleeve 3. The said spring 7 is fitted in a housing 9 and is supported against an internally projecting flange 10 of said housing. The housing also has an externally projecting flange 11 at its other end which operates as a friction disk and engages a flange on a coupling sleeve 8 which is rotatably mounted on the housing 9.

Since, when operating on a floor, cutters of different working diameters are required from time to time, the cutters have to be changed frequently. This change-over can be effected easily and rapidly by loosening a screw 17, which holds the cutter head assembly on the shaft 2 by means of a washer 18, sliding the hexagonal sleeve 3 off the hexagonal shaft 2 and replacing the withdrawn assembly by another similar assembly of different diameter.

Figure 3:
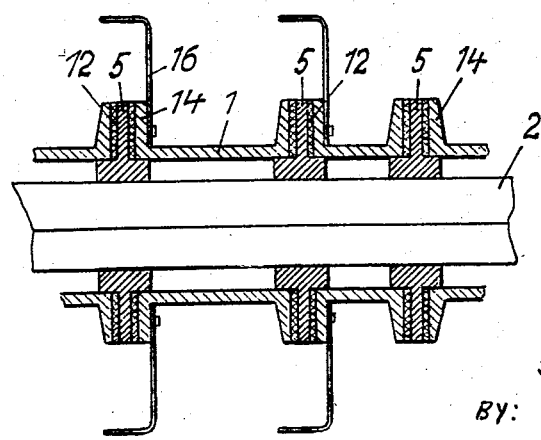
Figure 3 is a longitudinal section through part of another embodiment of the invention.

Various modifications are possible within the scope of this invention. For example, the friction linings 12 may be arranged on the flanges 14 and 15 instead of on the disks 5. Or again, the tubular socket 3 may be dispensed with, in which case the friction disks would be mounted directly upon the shaft 2 as shown in Figure 3.

I claim:

1. A rotary cutter head assembly for a motor cultivator having a polygonal section driving shaft, comprising a hollow polygonal section tubular socket element adapted to be removably secured over said shaft and having a radial flange formed on one end thereof, a plurality of friction disks having projecting hubs slidably but not rotatably mounted by means of said hubs on said socket element, a plurality of coupling sleeves having radial flanges on their ends, a spring mounted on said shaft element at the end remote from its flange, a spring housing enclosing said spring and surrounded by one of said coupling sleeves, said housing having an inwardly projecting flange at one end serving as an abutment for one end of said spring and an outwardly projecting flange at its other end frictionally engaging the adjacent flange of the surrounding coupling sleeve, a removable abutment ring for the other end of said spring, retaining means for detachably securing said abutment ring in position on the driving shaft, and cutters secured to one flange on each sleeve on the side thereof opposite to that engaging the adjacent friction disk, the coupling sleeve at the end remote from the spring being rotatably mounted at one end on the socket element and at the other end on one of the disk hubs, the spring acting through its housing to maintain frictional engagement between the flange of the socket element, the external flange of the spring housing and the friction disks on the one hand and the adjacent end surfaces of the flanges of the coupling sleeves on the other hand.

2. A rotary cutter head assembly for cultivators and the like, comprising, in combination, an elongated drive shaft means of polygonal cross section; a plurality of friction discs slidably mounted on said drive shaft means and being spaced therealong, each of said discs having a hub portion formed with a polygonal opening mating with said shaft means and through which said shaft means passes so that said discs are constrained to rotate with said shaft means, and each of said discs having an annular flange portion extending from said hub portion thereof, being narrower than the latter, and being located between opposite ends of said hub portion; a plurality of sleeves respectively located between each pair of successive discs, said sleeves each having a tubular portion freely turnable on and overlapping adjacent hub portions of each of said pairs of discs, and said sleeves each having annular flanges at opposite ends thereof respectively located opposite and facing each pair of annular flange portions of each pair of successive discs; tool means fixed to each of said sleeves between said flanges thereof; and spring means operatively connected to said sleeves and discs for urging the same toward each other, said spring means comprising a cylindrical housing located about said shaft means at a free end portion thereof and having an inwardly extending flange at one end thereof extending toward said shaft means and an outwardly extending flange at an opposite end thereof extending away from said shaft means and located adjacent the extremity of said free end portion thereof, an additional sleeve mounted about said housing and being located between said outwardly extending flange thereof and said plurality of sleeves, stop means mounted on said free end portion of said shaft means and extending into said housing, a coil spring located about said shaft means, bearing at one end against said inwardly extending flange of said housing, and at an opposite end against said stop means to urge said outwardly extending flange of said housing toward said additional sleeve, and additional tool means fixed to said additional sleeve.

3. A rotary cutter head assembly as defined in claim 2 and wherein said stop means is adjustable and substantially covers the annular space between said housing and shaft means.

References Cited in the file of this patent

UNITED STATES PATENTS

| Number | Name | Date |
|---|---|---|
| 2,324,065 | Coffing | July 13, 1943 |
| 2,477,662 | Seaman | Aug. 2, 1949 |

FOREIGN PATENTS

| Number | Country | Date |
|---|---|---|
| 354,589 | Great Britain | Aug. 13, 1931 |
| 48,793 | Denmark | May 28, 1934 |